United States Patent
Joy et al.

(10) Patent No.: US 10,198,225 B1
(45) Date of Patent: Feb. 5, 2019

(54) PRINTING USING AVAILABLE ACCOUNT CREDITS

(71) Applicant: Xerox Corporation, Norwalk, CT (US)

(72) Inventors: Derine Joy, Kerala (IN); Kuldeep Singh, Haryana (IN); Reshmasri Jalli, Pradesh (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/666,720

(22) Filed: Aug. 2, 2017

(51) Int. Cl.
*G06F 3/12* (2006.01)
*H04N 1/34* (2006.01)
*H04N 1/00* (2006.01)

(52) U.S. Cl.
CPC .......... *G06F 3/1224* (2013.01); *G06F 3/1205* (2013.01); *G06F 3/1239* (2013.01); *G06F 3/1256* (2013.01); *G06F 3/1285* (2013.01); *H04N 1/00015* (2013.01); *H04N 1/00039* (2013.01); *H04N 1/00068* (2013.01); *H04N 1/00074* (2013.01); *H04N 1/346* (2013.01); *H04N 2201/0094* (2013.01)

(58) Field of Classification Search
CPC ............................ G06F 3/1224; G06F 3/1205
See application file for complete search history.

(56) References Cited

U.S. PATENT DOCUMENTS

| | | | |
|---|---|---|---|
| 6,712,266 B2 | 3/2004 | Bartley et al. | |
| 6,854,839 B2 | 2/2005 | Collier et al. | |
| 7,044,381 B2 | 5/2006 | Silverbrook et al. | |
| 7,839,521 B2 * | 11/2010 | Bard | G06F 3/1222 358/1.15 |
| 8,019,695 B2 | 9/2011 | Nagarajan | |
| 8,643,869 B2 * | 2/2014 | Takamiya | H04N 1/46 358/1.1 |
| 8,650,088 B2 | 2/2014 | VanWinckle et al. | |
| 8,982,382 B2 * | 3/2015 | Amiya | G06Q 20/145 358/1.14 |
| 9,536,242 B2 | 1/2017 | Hendley et al. | |
| 2004/0138945 A1 | 7/2004 | Adkins et al. | |
| 2009/0064002 A1 * | 3/2009 | Katsumata | G03G 15/5016 715/762 |
| 2013/0110744 A1 | 5/2013 | Hendley et al. | |
| 2015/0355870 A1 | 12/2015 | Webb et al. | |

\* cited by examiner

*Primary Examiner* — Ibrahim Siddo
(74) *Attorney, Agent, or Firm* — Gibb & Riley, LLC (57) ABSTRACT

An interface device receives, from a client, an instruction to print an original print job, and a processor that is in communication with the interface, calculates an initial cost to print the original print job. A communications device transmits, to an accounting device, a printing account inquiry of the client; and, in response, the communications device receives a printing account balance of the client. The processor determines if the initial cost exceeds the printing account balance; and, if so, the processor calculates modifications to transform the original print job into a modified print job that has a modified cost (that is above zero) that is not greater than the printing account balance. In such a situation, the interface displays a message that the initial cost exceeds the account balance, but that the modified print job does not exceed the account balance, with an option to print the modified print job.

20 Claims, 8 Drawing Sheets

N-Up Printed Job (2 pages/sheet)

Please enter modifications below:

1. Specify the number of pages to print per sheet: ___4___  —142
2. Specify pages to print N-up:
   ___4-10___
3. Add Duplex Printing
4. Add Monochrome   —144

Cost $3.75

PRINTING USING AVAILABLE ACCOUNT CREDITS

BACKGROUND

Field of the Invention

Systems and methods herein generally relate to printing devices and systems that charge a client account for the cost of printing, and more particularly to situations where the client account does not have sufficient credits for a submitted print job.

Description of Related Art

Modern connected printing devices and systems are in communications with accounting systems that charge a client's printing account for the cost of printing. In situations where the client's account does not have sufficient credits for a submitted print job, all or part of the job is rejected by such systems.

If the job size is larger than the accounting limit, the remainder of the print job can simply be deleted after the initial number of pages that are available with the accounting limit are printed. This requires the user to recharge the account, and re-submit the pages of the job that did not print. For example, if a user has a low accounting limit (only 5 sheets left) and the user submits a 10-page print job, the system will simply not print the job (and delete it), or will only print the first 5 pages, and delete the remainder of the job. This requires the user to add monetary or other credits to recharge/refill their printing account, to resubmit the print job, etc., which can be very inconvenient for the user, especially if the printed item is needed immediately.

SUMMARY

Various printing devices herein include (among other components) a processor device; and an interface device, a communications device, a printing engine, an electronic memory, etc., all in communication with the processor device.

The processor receives, from a client, an instruction to print an original print job, and the processor automatically calculates an initial cost to print the original print job. These initial costs (and the costs of the modified print jobs discussed below) are counted using any units that can be budgeted, such as a monetary cost, costs counted in the number of sheets of print media, point credit system costs, etc. The communications device automatically transmits, to an accounting device, a printing account inquiry of the client. In response to the printing account inquiry, the communications device receives, from the accounting device, a printing account balance of the client.

The processor can then automatically perform a comparison to determine if the initial cost exceeds the printing account balance. With such devices, the printing engine prints the original print job if the initial cost does not exceed the printing account balance. However, if the initial cost exceeds the printing account balance, the devices herein help the user manage print jobs when the user is about to exceed an accounting limit by providing menu choices that allow the user to manually modify the print job to reduce the cost of the print job. Alternatively, the processor can automatically calculate one or more different ways to print the original print job (that are different from the printing specifications in the original print job) and this automatically produces one or more modifications to transform the original print job into one or more modified print jobs.

The processor also automatically calculates the cost of each of the modified print jobs, where each of the modified print jobs will have some cost (that is above zero). The modified print jobs can still print all of the pages of the original print job, but do so using less expensive printing techniques, such as lower quality printing (lower resolution, less ink/toner, lighter printing, etc.), N-up printing, duplex printing, monochrome in place of color, printing on less expensive paper, printing at a different time of day, printing at a different location, etc. Therefore, in one example, the modified print jobs can have a lower quality, and/or use fewer sheets of print media relative to the original print job.

Then, the processor automatically performs a filtering process to remove the modified print jobs that have a modified job cost that is greater than the printing account balance, and this process leaves what are referred to herein as modified print job options. Therefore, when the initial cost exceeds the printing account balance, the interface automatically displays a menu that provides the client a message that the initial cost of the original print job exceeds the account balance, but that one or more modified print job options do not exceed the account balance. To aid in the client's understanding of this message, the initial cost of the original print job and the client's account balance can also be displayed by the interface.

The menu that is provided to the client can also automatically display an option to cancel the original print job, along with the menu options of the modified print job options. Further, the menu can display an option to hold the original print job in the electronic memory until additional credits can be added to the client's printing account balance (with an option button to add credits to the printing account balance of the client). This menu can additionally automatically display the costs of each of the modified print job options, to aid in the user selection from such menu options.

Additionally, in response to the selection of one of the modified print job options from the menu, the interface can automatically display a second menu of additional alterations that the client can make to the selected modified print job, where the second menu includes user-selectable options that change print settings of the selected modified print job (e.g., (resolution, amount of ink/toner, lightness of printing, N-up printing options, duplex printing options, monochrome in place of color options, printing on less expensive paper, printing at a different time of day, printing at a different location, etc.). With such devices, the printing engine prints the selected modified print job in response to client selection of one of the modified print job options from the menu.

Presented in method form, various methods herein receive, from a client into a printing device, an instruction to print an original print job. These methods automatically calculate an initial cost to print the original print job. This initial cost (and the costs of the modified print jobs discussed below) are counted using any units that can be budgeted, such as a monetary cost, costs counted in the number of sheets of print media, a point credit system cost, etc. These methods automatically transmit, from the printing device to an accounting device, a printing account inquiry of the client. In response to the printing account inquiry, the methods herein receive, from the accounting device, a printing account balance of the client.

These methods can then automatically perform a comparison to determine if the initial cost exceeds the printing account balance. With such methods, the printing engine prints the original print job if the initial cost does not exceed the printing account balance. However, if the initial cost exceeds the printing account balance, the methods herein help the user manage print jobs when the user is about to exceed an accounting limit by providing menu choices that allow the user to manually modify the print job to reduce the cost of the print job. Alternatively, the methods automatically calculate one or more different ways to print the original print job (that are different from the printing specifications in the original print job) and this automatically produces one or more modifications to transform the original print job into one or more modified print jobs.

The methods also automatically calculate the cost of each of the modified print jobs, where each of the modified print jobs will have some cost (that is above zero). The modified print jobs still print all of the pages of the original print job, but do so using less expensive printing techniques, such as lower quality printing (lower resolution, less ink/toner, lighter printing, etc.), N-up printing, duplex printing, monochrome in place of color, printing on less expensive paper, printing at a different time of day, printing at a different location, etc. Therefore, in one example, the modified print jobs can have a lower quality, and/or use fewer sheets of print media relative to the original print job.

Then, the methods automatically perform a filtering process to remove the modified print jobs that have a modified job cost that is greater than the printing account balance, and this process leaves what are referred to herein as modified print job options. Therefore, when the initial cost exceeds the printing account balance, the methods herein automatically display a menu on the interface that provides the client a message that the initial cost of the original print job exceeds the account balance, but that one or more modified print job options do not exceed the account balance. To aid in the client's understanding of this message, the initial cost of the original print job and the client's account balance can also be displayed by the interface.

The menu that is provided to the client can also automatically display an option to cancel the original print job, along with the menu options of the modified print job options. Further, the menu can display an option to hold the original print job in the electronic memory until additional credits can be added to the client's printing account balance (with an option button to add credits to the printing account balance of the client). This menu can additionally automatically display the costs of each of the modified print job options, to aid in the user selection from such menu options.

Additionally, in response to the selection of one of the modified print job options from the menu, the interface can automatically display a second menu of additional alterations that the client can make to the selected modified print job, where the second menu includes user-selectable options that change print settings of the selected modified print job (e.g., (resolution, amount of ink/toner, lightness of printing, N-up printing options, duplex printing options, monochrome in place of color options, printing on less expensive paper, printing at a different time of day, printing at a different location, etc.). With such methods, the printing engine prints the selected modified print job in response to client selection of one of the modified print job options from the menu.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

As mentioned above, in situations where a client's printing account does not have sufficient credits for a submitted print job, all or part of the job can be rejected by conventional systems. Such systems do not help a user who is running short of accounting credits to print full jobs from the available credits. Therefore, the systems and methods herein utilize the available credits in a more efficient way. For example, with systems and methods herein, when a user submits a job having more pages than the user is allowed to print, the user is prompted with a message that they are not allowed to print the entire job with their available credits, and instead the user is given options that allow user to print the job in a different way, without having to pause their printing activities to recharge their account.

More specifically, this disclosure provides processing that helps the user manage print jobs when the user is about to exceed an accounting limit by providing menu choices that allow the user to manually modify the print job to reduce the cost of the print job. In one example, a user may submit a 10-page job, but the user may only have sufficient credits to print 5 pages. When the processes herein receive a job, they check whether the particular user has enough accounting credits; and, if not, the user will be shown a pop up menu with options 102, such as those shown in display menu 100 in FIG. 1. More specifically, option 1 in FIG. 1 allows the user to select the page number(s) the user wants to print (only selected pages will be printed); option 2 in FIG. 1 allows the user to select the N-up feature (so that the user can print all pages required in 5 sheets or less); option 3 in FIG. 1 allows the user to move the job to a hold state, and print entire job after account is recharged; and option 4 in FIG. 1 allows the user to delete the job.

Figure 1:
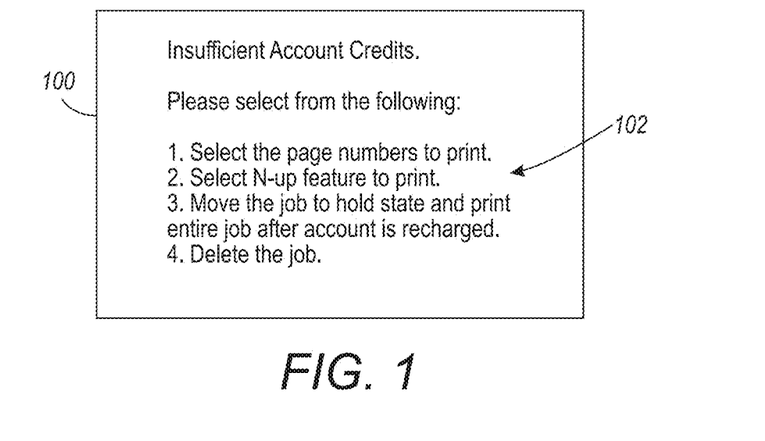
FIGS. 1-3 are schematic diagrams illustrating menus provided by devices and methods herein.
Figure 2:
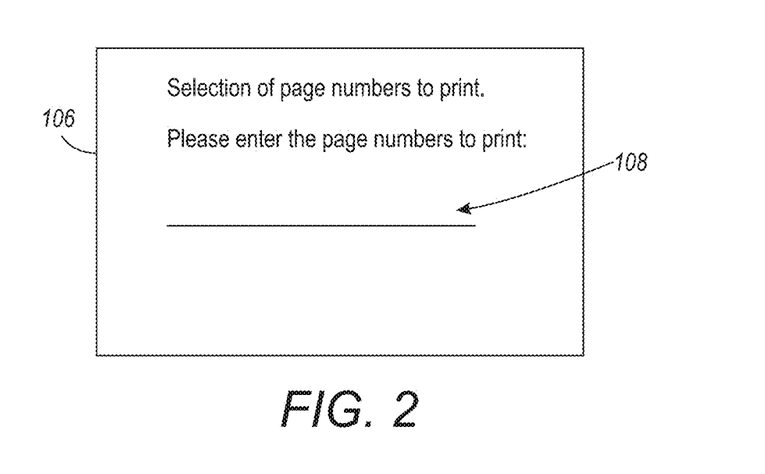

If the user selects the first option "1. Select the page numbers to print"; the secondary menu 106 shown in FIG. 2 will be displayed with an entry blank 108 to allow the user to specify the page numbers that the user would like to print. If the user specifies page numbers 2, 3, 4, and 9 in the blank 108 in FIG. 2 for printing, then only these pages will be printed and rest will be deleted.

Figure 3:
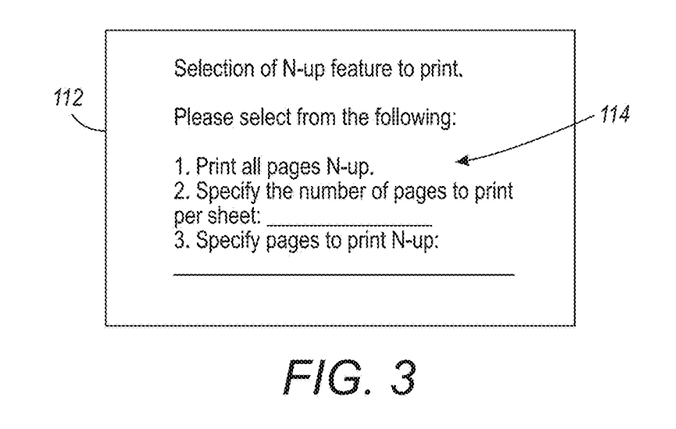

Alternatively, if the user selects the second option in FIG. 1 "2. N-up feature to print," then the secondary menu 112 shown in FIG. 3 will be displayed with options 114 to allow the user to specify: 1) whether N-up printing is to be applied to full document; 2) how many pages per sheet the user wishes to print; 3) which selected pages will be printed N-up; etc.

Figure 4A:
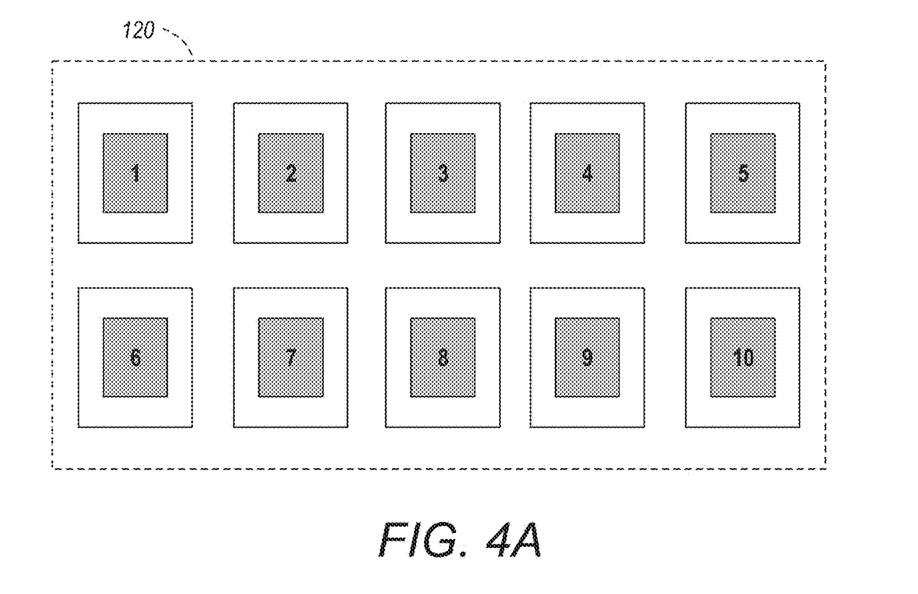
FIGS. 4A-4B are schematic diagrams of modifications to a print job performed by devices and methods herein.
Figure 4B:
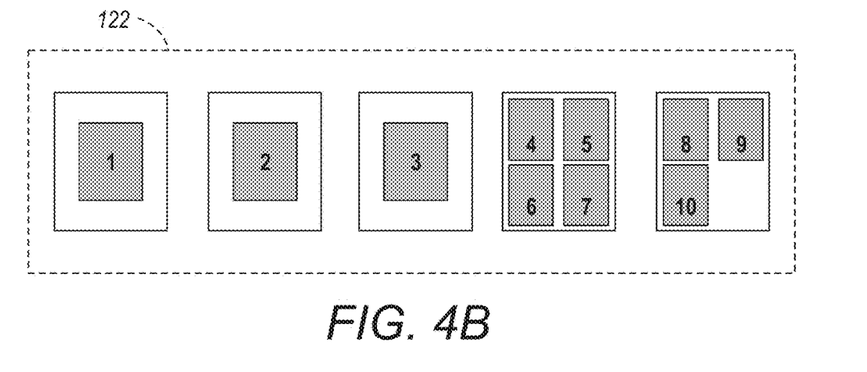

One example of selection of the N-up option is shown in FIGS. 4A-4B. FIG. 4A shows the 10 pages 120 in the print job (again, however, the user only has printing credits to print 5 sheets). If the user specifies (in the menu shown in FIG. 3) 4 pages per sheet; and for N-up to be applied only to pages 4-10; this will cause devices and methods herein to print pages 1-3 on full sheets, while pages 4-10 are printed N-up, as shown in item 122 in FIG. 4B. Therefore, as shown in this example, all pages of the user's 10-page document are printed successfully using only 5 sheets of paper.

Referring again to FIG. 1, the third option "3. Move the job to hold state and print entire job after account is recharged," causes devices and methods herein to put the entire print job in a hold state; and printing will only start when the accounting credits are greater than or equal to the number of pages in the document. In this example, the user's 10 page job is held in electronic memory, until the accounting credits are 10 pages or more. Also FIG. 1 illustrates a fourth option "4. Delete the job," selection of which causes devices and methods herein to delete the entire print job.

Therefore, the devices and methods herein provide the ability to print jobs even when a user is low on credits. This avoids requiring the user to re-submit the job, which saves user time; and this can avoid unexpected partially printed jobs (which are often discarded) and therefore saves valuable resources (paper, toner, electricity, machine usage, time, etc.).

Additionally, the devices and methods herein can automatically calculate one or more different ways to print the original print job (that are different from the printing specifications in the original print job) and this automatically produces one or more modifications to transform the original print job into one or more modified print jobs with lower costs. For example, FIG. 5 is an alternative menu 130 that can be presented when the print job cost exceeds the account balance, which shows such automatically calculated modified print jobs.

Figure 5:
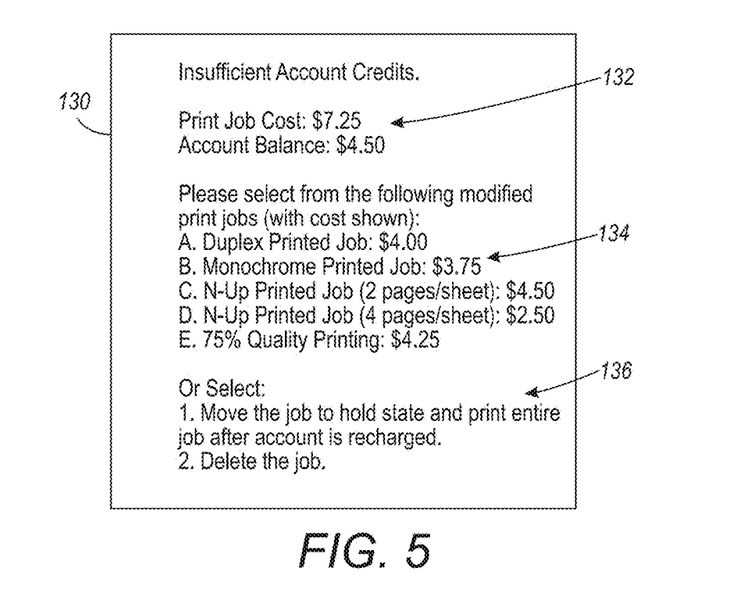
FIGS. 5-6 are schematic diagrams illustrating menus provided by devices and methods herein.

More specifically, FIG. 5 shows the cost of the print job compared to the account balance (132). FIG. 5 also shows modified print jobs with associated costs in item 134. For example, duplexing a single sided 10 page color job reduces the cost from $7.25 to $4.00; printing the single sided 10 page job in black and white (monochrome) reduces the cost from $7.25 to $4.00; printing the single sided 10 page color job in 2 pages per sheet N-up printing reduces the cost from $7.25 to $4.50; printing the single sided 10 page color job in 4 pages per sheet N-up printing reduces the cost from $7.25 to $2.50; printing using 75% quality reduces the cost from $7.25 to $4.25; etc. Also, the user has the options to hold the job until the account can be recharged, or delete the job, as shown in item 136, as discussed above.

Therefore, as shown in FIG. 5, the full job can be printed for the remaining account balance of $4.50, or less, using the devices and methods herein. The modified print jobs can still print all of the pages of the original print job, but do so using less expensive printing techniques, such as lower quality printing (lower resolution, less ink/toner, lighter printing, etc.), N-up printing, duplex printing, monochrome in place of color, printing on less expensive paper, printing at a different time of day, printing at a different location, etc.

Figure 6:
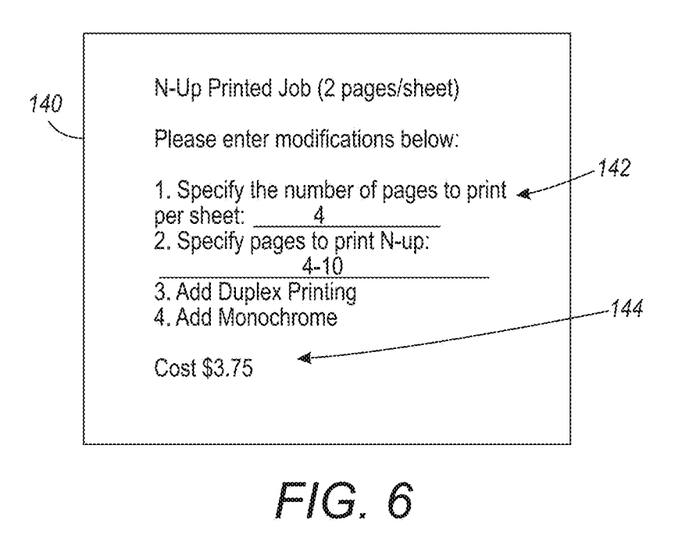

In response to the selection of one of the modified print job options from the menu (e.g., choice C in FIG. 5), as shown in FIG. 6, the interface can automatically display one or more secondary menus 140 of additional alterations that the client can make to the selected modified print job. For example, the secondary menus can include user-selectable options that change print settings of the selected modified print job (e.g., (resolution, amount of ink/toner, lightness of printing, N-up printing options, duplex printing options, monochrome in place of color options, printing on less expensive paper, printing at a different time of day, printing at a different location, etc.). Therefore, as shown in item 142 in FIG. 6, the selected option C (N-Up Printed Job (2 pages/sheet) from FIG. 5 can be further modified to change the number of pages to print per sheet, to change the pages that will receive N-up printing, to add a duplex printing restriction to the 2 page/sheet N-up job, to add monochrome printing restriction to the 2 page/sheet N-up job, etc.

Furthermore, as options 142 are selected or changed in FIG. 6, the real time cost of printing with such modified options can be calculated and displayed (item 144), immediately after the user makes changes to options 142, to allow the user to understand the cost reductions being achieved. Therefore, if the user selects printing pages 1-3 as full pages, and printing pages 4-10 as four pages/sheet N-up printing (as shown in FIG. 4B), the total updated cost is calculated by devices and methods herein to be $3.75, and the same is displayed in item 144 immediately after the user enters the numbers in the blanks in item 142.

Figure 7:
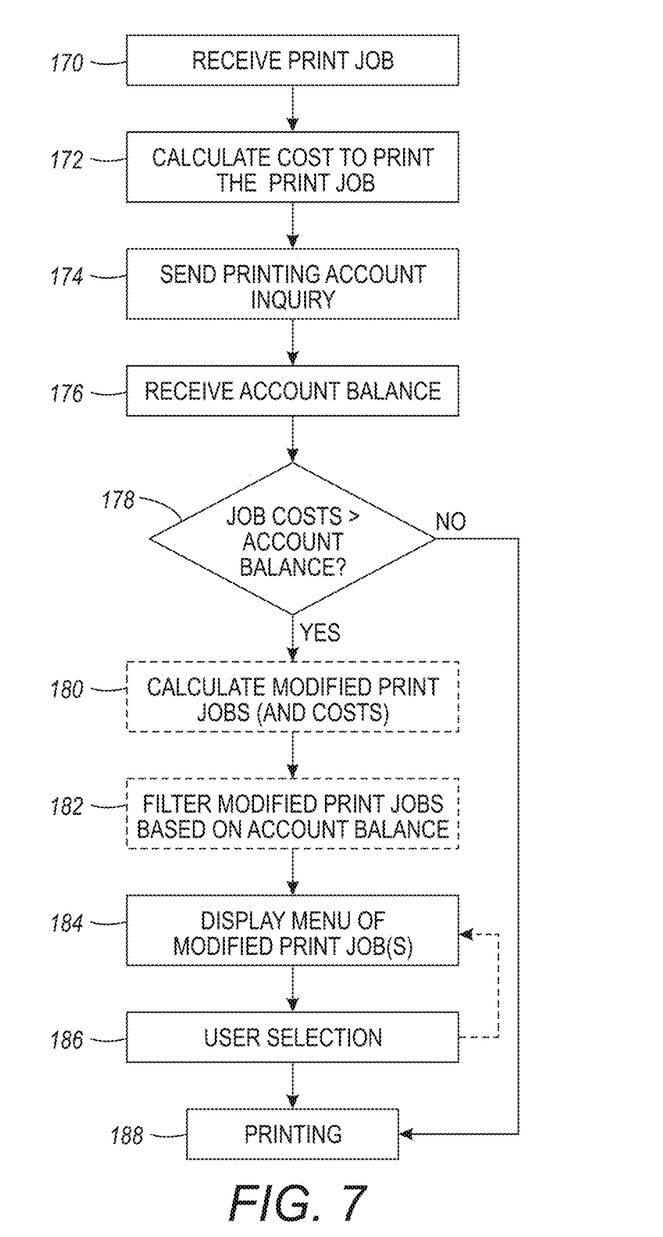
FIG. 7 is a flow diagram illustrating processing performed by devices and methods herein.

FIG. 7 is flowchart illustrating exemplary methods herein. In item 170, these methods receive, from a client into a printing device, an instruction to print an original print job. Print jobs can be any form of printing instructions, but generally include data (texts, graphics, images, etc.) that is to be printed, along with details about how to print such data (e.g., colors, image quality, duplexing, paper size/type, etc.), and finishing instructions (stapling, hole-punching, book-making, binding, etc.).

These methods automatically calculate the cost that it will take to print the original print job in item 172, and this is referred to herein as the "initial costs." For purposes herein "costs" are not limited to monetary costs, but instead, the print job costs are counted using any units that can be budgeted, such as a monetary cost, costs counted in the number of sheets of print media, supply usage costs, a point credit system cost, etc.

In item 174, the methods automatically transmit, from the printing device to an accounting device, a printing account inquiry of the client. The accounting device can be a component of the printer, or can be a separate server connected to the printer by way of a computerized network. In response to the printing account inquiry, the methods herein receive, from the accounting device, a printing account balance of the client, as shown in item 176.

These methods can then, as shown in item 178, automatically perform a comparison to determine if the initial cost exceeds the printing account balance. With such methods, the printing engine prints the original print job in item 188 if the initial cost does not exceed the printing account balance. Notice that items shown using dashed lines are optional.

However, if the initial cost exceeds the printing account balance, the devices herein help the user manage print jobs when the user is about to exceed an accounting limit by providing menu choices (184 and FIGS. 1-3) that allow the user to manually modify the print job to reduce the cost of the print job. Alternatively, in items 180-182 (and FIGS. 5-6) the methods herein automatically calculate one or more different ways to print the original print job (that are different from the printing specifications in the original print job) and this automatically produces one or more modifications to transform the original print job into one or more modified print jobs (item 180). In item 180, this processing also automatically calculates the cost of each of the modified print jobs, where each of the modified print jobs will have some cost (that is above zero).

The modified print jobs can still print all of the pages of the original print job, but do so using less expensive printing techniques, such as lower quality printing (lower resolution, less ink/toner, lighter printing, etc.), N-up printing, duplex printing, monochrome in place of color, printing on less expensive paper, printing at a different time of day, printing at a different location, etc. Therefore, in one example, the modified print jobs created in item 180 can have a lower quality, and/or use fewer sheets of print media relative to the original print job, etc. Then, in item 182 the methods automatically perform a filtering process to remove the modified print jobs that have a modified job cost that is greater than the printing account balance, and this process leaves what are referred to herein as modified print job options.

The result of the processing that started when item 178 determined that the initial cost exceeded the printing account balance, is shown in item 184, where the methods herein automatically display a menu on the interface that provides the client a message that the initial cost of the original print job exceeds the account balance, but that one or more modified print job options are available. To aid in client understanding of this message, the initial cost of the original print job and the client's account balance can also be displayed by the interface in item 184.

As shown in FIGS. 1-3 and 5-6, this menu that is provided to the client in item 184 can also automatically display an option to cancel the original print job, along with the other menu options, such as an option to hold the original print job in the electronic memory until additional credits can be added to the client's printing account balance (with an option button to add credits to the printing account balance of the client); and can display the costs of each of the modified print job options, to aid in the user selection from such menu options, etc.

Item 186 shows the user selection from the menu in item 184, and in response to the selection of one of the modified print job options from the menu, the interface can automatically display one or more secondary menus of additional alterations that the client can make to the selected modified print job, as shown by the loop back from item 186 to item 184. For example, the secondary menus can include user-selectable options that change print settings of the selected modified print job (e.g., (resolution, amount of ink/toner, lightness of printing, N-up printing options, duplex printing options, monochrome in place of color options, printing on less expensive paper, printing at a different time of day, printing at a different location, etc.). With such methods, in item 188 the printing engine prints the selected modified print job in response to client selection of one of the modified print job options from the menu.

The hardware described herein plays a significant part in permitting the foregoing method to be performed, rather than function solely as a mechanism for permitting a solution to be achieved more quickly, (i.e., through the utilization of a computer for performing calculations). As would be understood by one ordinarily skilled in the art, the processes described herein cannot be performed by a human alone (or one operating with a pen and a pad of paper) and instead such processes can only be performed by a machine. Specifically, processes such as receiving electronic data streams of print jobs, making electronic inquiries of accounting databases for account balances, preparing electronic displays, etc., requires the utilization of different specialized machines, and humans performing such processing would not produce useful results because of the time lag, inconsistency, and inaccuracy humans would introduce into the results. Further, processes such as, electronic transmission of data over networks, creating bitmaps, altering bitmaps, controlling printheads using electronic data within bitmaps, etc., requires the utilization of different specialized machines. Specifically, processes such as processing data pixel-by-pixel, electronically storing bitmaps as 1's and 0's, etc., requires the utilization of different specialized machines.

Further, such machine-only processes are not mere "post-solution activity" because the methods utilize machines at each step, and cannot be performed without machines. Also, the data transmissions and modifications are integral with the process performed by the methods herein, and are not mere post-solution activity, because the methods herein rely upon the account balance receipt, the automated modifications to the print job data, the automated comparison processes, and cannot be performed without such electronic transmissions/calculations. In other words, these various machines are integral with the methods herein because the methods cannot be performed without the machines (and cannot be performed by humans alone).

Additionally, the methods herein solve many highly complex technological problems. For example, as mentioned above, users suffer from the technological problem of having a job automatically deleted, or unexpectedly truncated if there is an insufficient account balance. Methods and devices herein solve this technological problem by finding a way to still print the full print job within the budget of the existing account balance; and do so with user customization to provide the most in user satisfaction. In doing so, the methods and systems herein greatly increase user satisfaction by allowing a user to complete a print job, without having the delay and aggravation associated with the task of interrupting the printing activity and immediately recharging/refilling their printing account. Instead, with such devices and methods the user can have their full print job (somewhat modified), allowing the user to recharge/refill their account at a later, more convenient, time.

Further, the methods and devices herein greatly simplify the operation from the user's viewpoint by reducing the number of interactions with the user interface, which decreases the amount of time needed to perform the operations described herein, etc. This, in turn, reduces the amount of time that the user interface is on (thereby saving power) and also reduces the load on all processing components (e.g., reduces load on the printing device, by avoiding the need to store print jobs while accounts are refilled, by avoiding processing redundant print jobs, etc.; reduces load on the processor, by avoiding calculations made for print jobs that will be fully, or partially, deleted because of low account balances, etc.). Thus, the methods herein reduce the amount and complexity of hardware and software needed to be purchased, installed, and maintained, thereby solving a substantial technological problem that users experience today.

Figure 8:
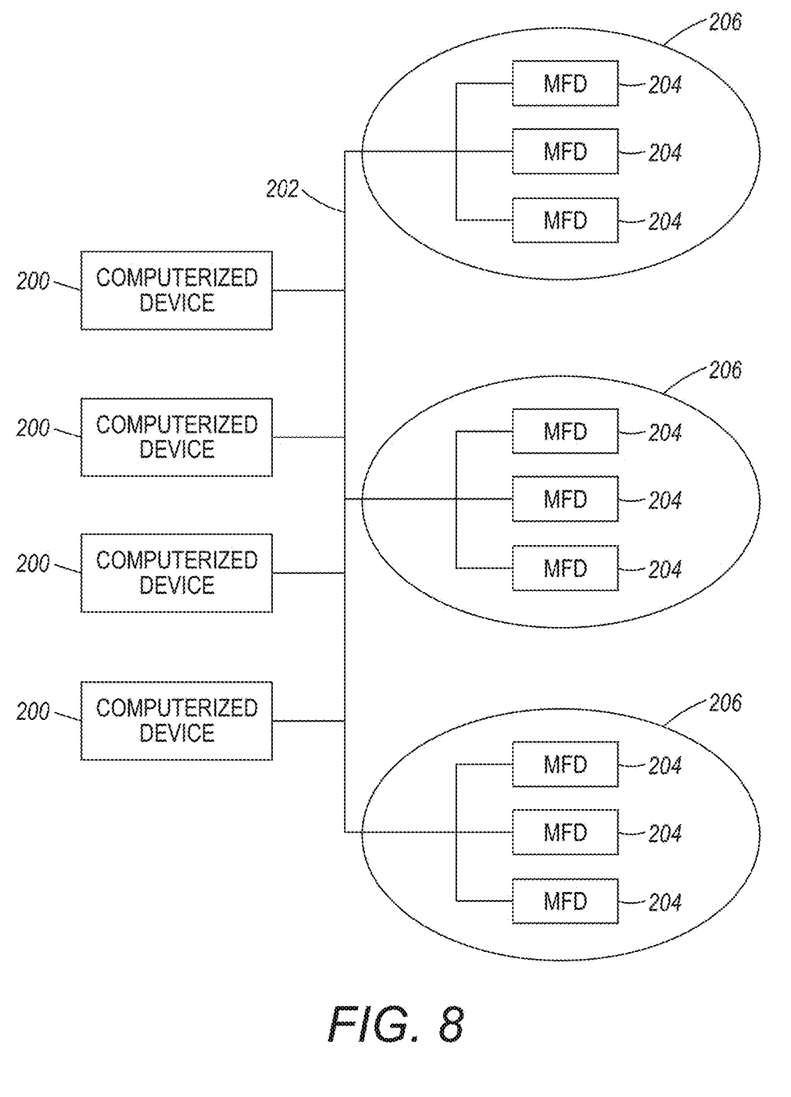
FIG. 8 is a schematic diagram illustrating systems herein.

As shown in FIG. 8, exemplary systems and methods herein include various computerized devices 200, 204 located at various different physical locations 206. The computerized devices 200, 204 can include print servers, printing devices, personal computers, etc., and are in communication (operatively connected to one another) by way of a local or wide area (wired or wireless) network 202.

Figure 9:
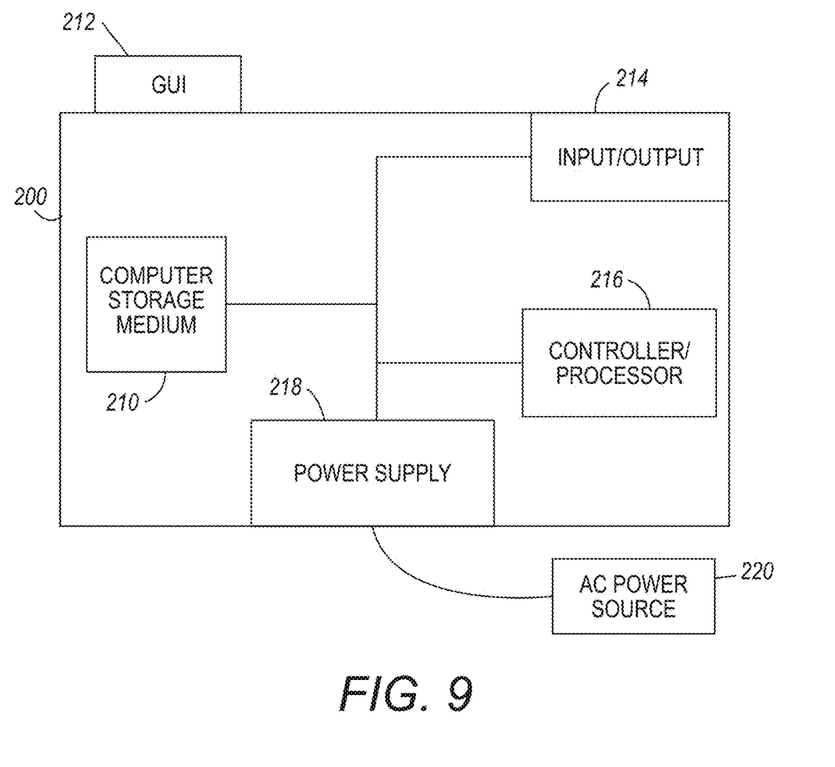
FIG. 9 is a schematic diagram illustrating devices herein.

FIG. 9 illustrates a computerized device 200, which can be used with systems and methods herein and can comprise, for example, an accounting server, a print server, a personal computer, a portable computing device, etc. The computerized device 200 includes a controller/tangible processor 216 and a communications port (input/output) 214 operatively connected to the tangible processor 216 and to the computerized network 202 external to the computerized device 200.

Also, the computerized device 200 can include at least one accessory functional component, such as a graphical user interface (GUI) assembly 212. The user may receive messages, instructions, and menu options from, and enter instructions through, the graphical user interface or control panel 212.

The input/output device 214 is used for communications to and from the computerized device 200 and comprises a wired device or wireless device (of any form, whether currently known or developed in the future). The tangible processor 216 controls the various actions of the computerized device. A non-transitory, tangible, computer storage medium device 210 (which can be optical, magnetic, capacitor based, etc., and is different from a transitory signal) is readable by the tangible processor 216 and stores instructions that the tangible processor 216 executes to allow the computerized device to perform its various functions, such as those described herein. Thus, as shown in FIG. 9, a body housing has one or more functional components that operate on power supplied from an alternating current (AC) source 220 by the power supply 218. The power supply 218 can comprise a common power conversion unit, power storage element (e.g., a battery, etc), etc.

Figure 10:
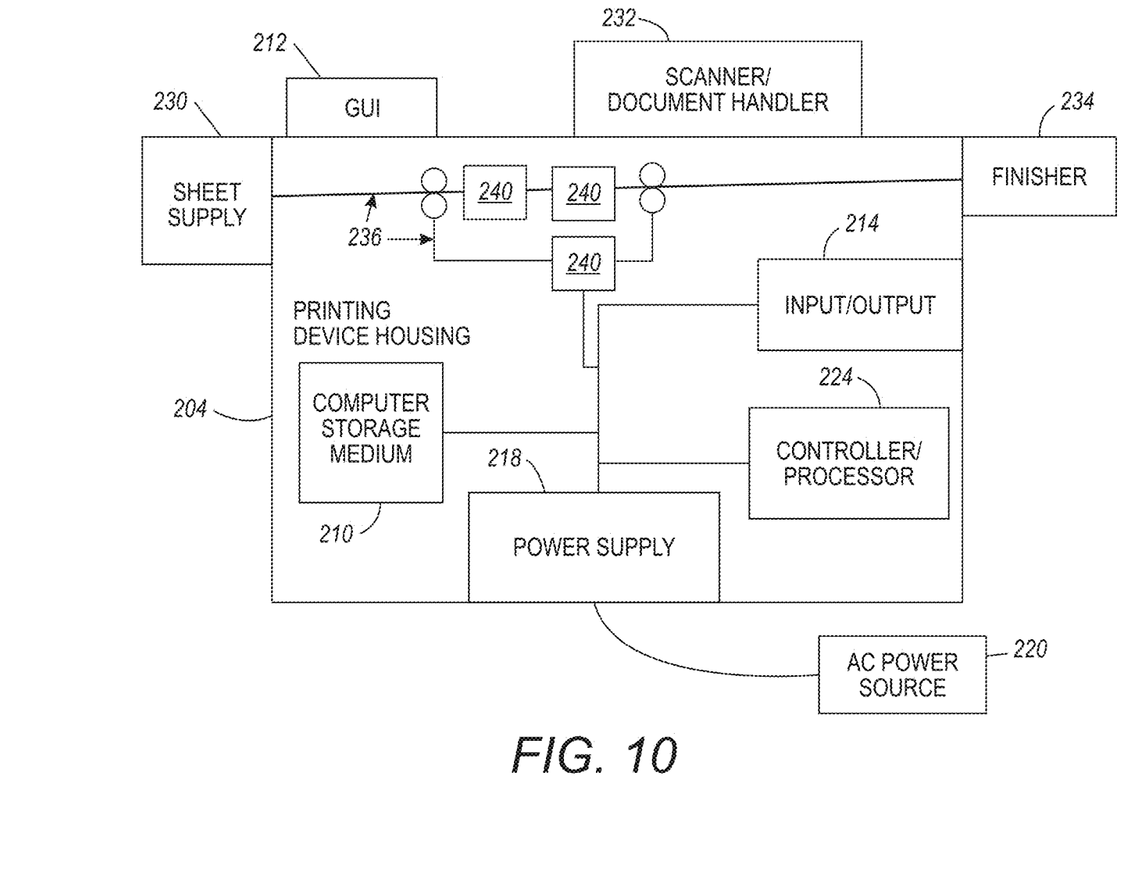
FIG. 10 is a schematic diagram illustrating printing devices herein.

FIG. 10 illustrates a computerized device that is a printing device 204, which can be used with systems and methods herein and can comprise, for example, a printer, copier, multi-function machine, multi-function device (MFD), etc. The printing device 204 includes many of the components mentioned above and at least one marking device (printing engine(s)) 240 operatively connected to a specialized image processor 224 (that is different from a general purpose computer because it is specialized for processing image data), a media path 236 positioned to supply continuous media or sheets of media from a sheet supply 230 to the marking device(s) 240, etc. After receiving various markings from the printing engine(s) 240, the sheets of media can optionally pass to a finisher 234 which can fold, staple, sort, etc., the various printed sheets. Also, the printing device 204 can include at least one accessory functional component (such as a scanner/document handler 232 (automatic document feeder (ADF)), etc.) that also operate on the power supplied from the external power source 220 (through the power supply 218).

The one or more printing engines 240 are intended to illustrate any marking device that applies a marking material (toner, inks, etc.) to continuous media or sheets of media, whether currently known or developed in the future and can include, for example, devices that use a photoreceptor belt or an intermediate transfer belt, or devices that print directly to print media (e.g., inkjet printers, ribbon-based contact printers, etc.).

Therefore, various printing devices herein include (among other components) a processor device 224; and an interface device 212, a communications device 214, a printing engine 240, an electronic memory 210, etc., all in communication with the processor 224.

The processor 224 is capable of receiving, from a client over the network 202, an instruction to print an original print job, and the processor 224 is capable of automatically calculating a cost to print the original print job (initial cost). This initial cost (and the costs of the modified print jobs discussed below) are counted using any units that can be budgeted, such as a monetary cost, costs counted in the number of sheets of print media, a point credit system cost, etc. The communications device 214 is capable of automatically transmitting over the network 202, to an accounting device 200, a printing account inquiry of the client. In response to the printing account inquiry, the communications device 214 receives, from the accounting device 200 over the network 202, a printing account balance of the client.

The processor 224 is capable of automatically performing a comparison to determine if the initial cost exceeds the printing account balance. With such devices, the printing engine 240 prints the original print job if the initial cost does not exceed the printing account balance. However, if the initial cost exceeds the printing account balance, the processor 224 is capable of automatically calculating one or more different ways to print the original print job (that are different from the printing specifications in the original print job) and this automatically produces one or more modifications to transform the original print job into one or more modified print jobs.

The processor 224 is also capable of automatically calculating the cost of each of the modified print jobs, where each of the modified print jobs will have some cost (that is above zero). The modified print jobs still print all of the pages of the original print job, but do so using less expensive printing techniques, such as lower quality printing (lower resolution, less ink/toner, lighter printing, etc.), N-up printing, duplex printing, monochrome in place of color, printing on less expensive paper, printing at a different time of day, printing at a different location, etc. Therefore, in one example, the modified print jobs can have a lower quality, and/or use fewer sheets of print media relative to the original print job.

Then, the processor 224 is capable of automatically performing a filtering process to remove the modified print jobs that have a modified job cost that is greater than the printing account balance, and this process leaves what are referred to herein as modified print job options. Therefore, when the initial cost exceeds the printing account balance, the interface 212 is capable of automatically displaying a menu that provides the client a message that the initial cost of the original print job exceeds the account balance, but that one or more modified print job options do not exceed the account balance. To aid in client understanding of this message, the initial cost of the original print job and the client's account balance can also be displayed by the interface 212.

This menu that is provided to the client can also automatically display an option to cancel the original print job, along with the menu options of the modified print job options. Further, the menu can display an option to hold the original print job in the electronic memory 210 until additional credits can be added to the client's printing account balance (with an option button to add credits to the printing account balance of the client). This menu can additionally automatically display the costs of each of the modified print job options, to aid in the user selection from such menu options.

Additionally, in response to the selection of one of the modified print job options from the menu, the interface 212 can is capable of automatically displaying a second menu of additional alterations that the client can make to the selected modified print job, where the second menu includes user-selectable options that change print settings of the selected modified print job (e.g., (resolution, amount of ink/toner, lightness of printing, N-up printing options, duplex printing options, monochrome in place of color options, printing on less expensive paper, printing at a different time of day, printing at a different location, etc.). With such devices, the printing engine 240 is capable of automatically printing the selected modified print job in response to client selection of one of the modified print job options from the menu.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

A print job includes a set of data that is to be printed, and can include images, graphics, and text from a variety of formats. In addition to the print data that will actually be printed on the print media, the print job also includes various commands controlling the printing; and such commands identify the printer to be used, the resolution of printing, the media type and size to be used, color characteristics, gloss characteristics, finishing operations to be performed, destinations of the printed pages, etc. A raster image processor (RIP) is a component used in a printing system that produces a raster image also known as a bitmap from the print job. The bitmap is then sent to a printing device for output. Raster image processing is the process that turns vector digital information into a high-resolution raster image. Further, the terms automated or automatically mean that once a process is started (by a machine or a user); one or more machines perform the process without further input from any user. In the drawings herein, the same identification numeral identifies the same or similar item.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A printing device comprising:
    an interface device receiving, from a client, an instruction to print an original print job;
    a processor in communication with said interface device, said processor calculates an initial cost to print said original print job; and
    a communications device in communication with said processor, said communications device transmits, to an accounting device, a printing account inquiry of said client,
    said communications device receives, from said accounting device, a printing account balance of said client in response to said printing account inquiry,
    said processor determines if said initial cost exceeds said printing account balance,
    said processor calculates modifications to transform said original print job into modified print jobs that have a modified cost that is above zero and is not greater than said printing account balance, in response to said initial cost exceeding said printing account balance,
    said processor filters said modified print jobs to remove said modified print jobs that have a modified job cost that is greater than said printing account balance, to leave modified print job options, and
    instead of printing said original print job, said interface device displays a message that said initial cost exceeds said printing account balance and that said modified print job options do not exceed said printing account balance, in response to said initial cost exceeding said printing account balance.

2. The printing device according to claim 1, said modified print jobs print all pages of said original print job using less expensive printing techniques.

3. The printing device according to claim 1, said interface device displays a second menu of additional alterations of said modified print jobs in response to selection of a modified print job, said second menu includes user-selectable options that change print settings of said modified print job.

4. The printing device according to claim 1, said modified print jobs have lower quality or uses less sheets of print media relative to said original print job.

5. The printing device according to claim 1, further comprising a printing engine in communication with said processor, said printing engine prints said original print job in response to said initial cost not exceeding said printing account balance, and said printing engine prints, a modified print job in response to selection of said modified print job.

6. The printing device according to claim 1, said initial cost and said modified cost are units in: a number of sheets of print media, a monetary cost, or a point credit system.

7. The printing device according to claim 1, said message includes:
    an option to hold said original print job in electronic memory that is in communication with said processor until credits can be added to said printing account balance; and
    an option to add credits to said printing account balance of said client.

8. A printing device comprising:
    an interface device capable of receiving, from a client, an instruction to print an original print job;

a processor in communication with said interface device, said processor is capable of calculating an initial cost to print said original print job; and a communications device in communication with said processor, said communications device is capable of transmitting, to an accounting device, a printing account inquiry of said client, said communications device is capable of receiving, from said accounting device, a printing account balance of said client in response to said printing account inquiry, said processor is capable of determining if said initial cost exceeds said printing account balance;

said processor is capable of calculating multiple ways to print said original print job that are different from printing specifications of said original print job, to produce multiple modifications to transform said original print job into modified print jobs, and to produce costs of said modified print jobs, in response to said initial cost exceeding said printing account balance, said processor is capable of filtering said modified print jobs to remove said modified print jobs that have a modified job cost that is greater than said printing account balance, to leave modified print job options, instead of printing said original print job, said interface device is capable of displaying a menu having a message that said initial cost exceeds said printing account balance and that said modified print job options do not exceed said printing account balance, in response to said initial cost exceeding said printing account balance, and said menu includes an option to cancel said original print job, and selections for said modified print job options, each displaying said costs of said modified print jobs.

9. The printing device according to claim 8, said modified print jobs print all pages of said original print job using less expensive printing techniques.

10. The printing device according to claim 8, said interface device is capable of displaying a second menu of additional alterations of said modified print jobs in response to selection of one of said modified print job options from said menu, said second menu includes user-selectable options that change print settings of a selected modified print job.

11. The printing device according to claim 8, said modified print jobs have lower quality or use less sheets of print media relative to said original print job.

12. The printing device according to claim 8, further comprising a printing engine in communication with said processor, said printing engine is capable of printing said original print job in response to said initial cost not exceeding said printing account balance, and said printing engine is capable of printing a selected one of said modified print jobs in response to selection of one of said modified print job options from said menu.

13. The printing device according to claim 8, said initial cost and said costs of said modified print jobs are units in: a number of sheets of print media, a monetary cost, or a point credit system.

14. The printing device according to claim 8, said menu includes:

an option to hold said original print job in electronic memory that is in communication with said processor until credits can be added to said printing account balance; and an option to add credits to said printing account balance of said client.

15. A method comprising:

receiving, from a client into a printing device, an instruction to print an original print job;

calculating, by said printing device, an initial cost to print said original print job;

transmitting, by said printing device to an accounting device, a printing account inquiry of said client;

receiving, by said printing device from said accounting device, a printing account balance of said client in response to said printing account inquiry;

determining, by said printing device, if said initial cost exceeds said printing account balance;

calculating, by said printing device, modifications to transform said original print job into modified print jobs that have a modified cost that is above zero and is not greater than said printing account balance, in response to said initial cost exceeding said printing account balance;

filtering said modified print jobs to remove said modified print jobs that have a modified job cost that is greater than said printing account balance, to leave modified print job options; and instead of printing said original print job, outputting, from said printing device to said client, a message that said initial cost exceeds said printing account balance and that said modified print job options do not exceed said printing account balance, in response to said initial cost exceeding said printing account balance.

16. The method according to claim 15, said modified print jobs print all pages of said original print job using less expensive printing techniques.

17. The method according to claim 15, further comprising providing a second menu of additional alterations of said modified print jobs in response to selection of a modified print job, said second menu includes user-selectable options that change print settings of said modified print job.

18. The method according to claim 15, said modified print jobs have lower quality or uses less sheets of print media relative to said original print job.

19. The method according to claim 15, further comprising:

printing, using a printing engine, said original print job in response to said initial cost not exceeding said printing account balance, and printing, using said printing engine, a modified print job in response to selection of said modified print job.

20. The method according to claim 15, said initial cost and said modified cost are units in: a number of sheets of print media, a monetary cost, or a point credit system.

* * * * *